United States Patent
Van Tuyl

(10) Patent No.: US 7,280,267 B2
(45) Date of Patent: Oct. 9, 2007

(54) DEVICE FOR REMOTELY STIMULATING AND MEASURING ELECTRONIC SIGNALS THROUGH A FIBER OPTIC CABLE

(75) Inventor: Rory L. Van Tuyl, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 50 days.

(21) Appl. No.: 10/782,051

(22) Filed: Feb. 19, 2004

(65) Prior Publication Data

US 2005/0185246 A1  Aug. 25, 2005

(51) Int. Cl.
  *G02F 1/29* (2006.01)
(52) U.S. Cl. ............................ 359/318; 359/247; 385/8
(58) Field of Classification Search ................ 359/315, 359/316, 318, 320, 239, 247; 385/8, 31; 356/477
See application file for complete search history.

(56) References Cited

U.S. PATENT DOCUMENTS

| | | | | |
|---|---|---|---|---|
| 5,402,234 A | * | 3/1995 | Deck ........................... | 356/497 |
| 5,402,259 A | * | 3/1995 | Lembo et al. ............... | 359/245 |
| 5,898,517 A | * | 4/1999 | Weis ........................... | 356/5.09 |
| 5,966,234 A | * | 10/1999 | Ford et al. ................... | 359/248 |
| 6,330,089 B1 | * | 12/2001 | Yamada ........................ | 398/9 |
| 2005/0062978 A1 | * | 3/2005 | Krause et al. ............... | 356/477 |

OTHER PUBLICATIONS

"Quantum Well Modulators," Lucent Technologies, Bell Labs Innovations, downloaded at http://www.bell-labs.com/project/oevlsi/tutorial/, pp. 1-3, (Feb. 4, 2004).
Miller, D.A.B., "Optoelectronic Applications of Quantum Wells," Optics & Photonics News 1, pp. 7-15, (Feb. 1990).
Hecht, Eugene, "Optics," 2nd Edition, Addison-Wesley Publishing Company, pp. 314-321, (1987).

* cited by examiner

*Primary Examiner*—Hung Dang
*Assistant Examiner*—Joseph Martinez

(57) ABSTRACT

An optoelectronic system includes an optical signal modulator, an optical input guide and an optical output guide connected to the optical signal modulator. The system further includes a reflective optical element in the optical signal modulator, the element disposed to reflect an input light beam incident through the optical input guide into an output light beam through the optical output guide. The system further includes electrical terminals in the optical signal modulator. The electrical terminals are configured such that an electrical signal on the electrical terminals is operable to interact with the input light beam.

20 Claims, 4 Drawing Sheets

DEVICE FOR REMOTELY STIMULATING AND MEASURING ELECTRONIC SIGNALS THROUGH A FIBER OPTIC CABLE

TECHNICAL FIELD

The invention relates to remote electronic testing and measurement and more particularly to systems and methods for remotely stimulating and measuring electronic signals through a fiber optic cable.

BACKGROUND OF THE INVENTION

When electrical signals being sourced or sensed are rapidly varying, i.e. when they contain high frequency components, it is often difficult to deliver these signals to or from a remote location using conventional means. Typically, high frequency signals are delivered via coaxial cable or other electrical transmission line, with or without the aid of repeater amplifiers. Conventional transmission lines are frequency dispersive, meaning that they distort the delivered signal relative to the sourced or sensed signal by attenuating or excessively delaying higher frequency components of the signal relative to the lower frequency components. Also, conventional transmission lines can distort a signal by means of reflections caused by impedance discontinuities along the line. A certain degree of distortion can be tolerated in a communication system, whereas in a measurement system signal distortion must be minimized. Further, in cases where a large dc voltage difference exists between the test instrument and the device being tested or in cases where the presence of a conducting element such as a coaxial cable can disturb the measurement, as for example antenna testing, connections such as coaxial cable are impractical.

BRIEF SUMMARY OF THE INVENTION

In accordance with an embodiment of the invention, an optoelectronic system is provided. The system includes an optical signal modulator, an optical input guide and an optical output guide connected to the optical signal modulator. The system further includes a reflective optical element in the optical signal modulator, the element disposed to reflect an input light beam incident through the optical input guide into an output light beam through the optical output guide. The system further includes electrical terminals in the optical signal modulator. The electrical terminals are configured such that an electrical signal on the electrical terminals is operable to interact with the input light beam.

In accordance with another embodiment of the invention, a method of remote delivery of a modulated signal is provided. The method includes modulating an input light beam with an electrical signal using optical signal modulation, and reflecting the modulated light beam into an output light beam direction different from that of the input light beam.

DETAILED DESCRIPTION OF THE INVENTION

It is often necessary or desirable to sense an electrical signal at a location remote from the measurement instrument that processes the sensed data. Likewise, it is often necessary to deliver an electronic signal to a location remote from the source of the signal. Indeed, it is sometimes desirable to both sense and deliver signals remotely with the same physical apparatus, so that devices being tested can be fully characterized in an efficient manner.

Over distances conventionally used for remote testing (meters to hundreds of meters), single-mode fiber optic cable is typically of low enough dispersion to cause negligible signal distortion. Also, photodetectors and reflection-mode electroabsorption modulators (REAMs) can be designed to have low signal distortion over useful ranges of signal level. Thus, the distance between electronic measurement instrument and location of remote device under test can be increased to distances much greater than possible with conventional electrical transmission lines, for example coaxial cables.

Figure 1:
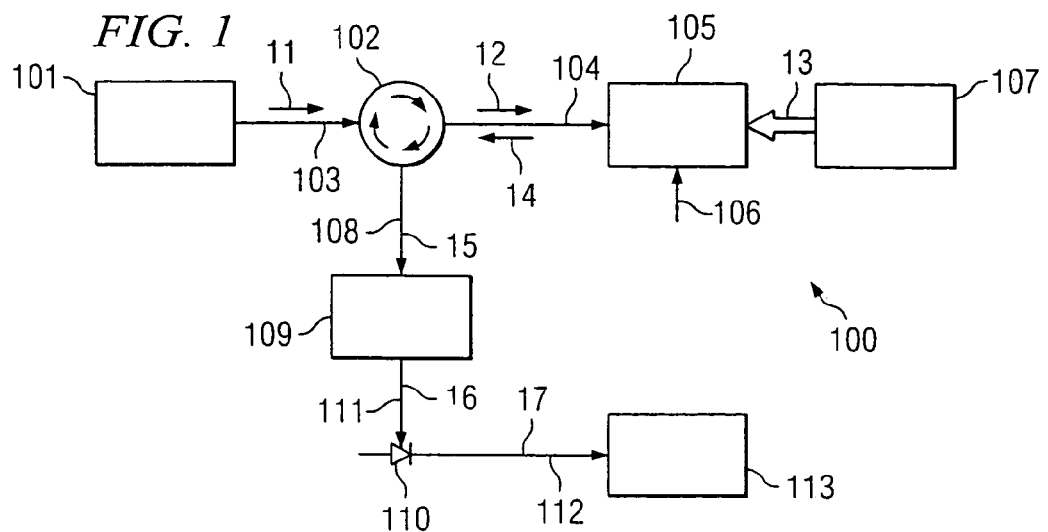
FIG. 1 depicts a system for delivering a copy of an electrical response signal from a remote electrical device under test to an electronic measurement instrument by means of a fiber optic cable, in accordance with embodiments of the invention.

FIG. 1 depicts system 100 for delivering a copy of an electrical response signal from a remote electrical device under test to an electronic measurement instrument by means of a fiber optic cable, in accordance with embodiments of the invention. In the remote sensing configuration shown in FIG. 1, continuous-wave (CW) light beam 11 launched by CW light source 101 passes through optical circulator 102 and through optical guide 104 as CW light beam 12. CW light beam 12 is modulated in an optical signal modulator, for example Reflection Mode Electroabsorption modulator (REAM) 105 at the remote sensing point by remote electrical signal 13 generated by remote electrical device 107. Bias voltage 106 is typically applied to REAM 105 to provide linear operation. Modulated light beam 14 is then reflected by REAM 105 back through optical guide 104, optical circulator 102, and optical guide 108 as modulated light beam 15, which is then typically amplified by optical amplifier 109 to provide amplified light beam 16 through optical guide 111. This amplified modulated light beam 16 is typically detected by photodetector 110, which generates photoelectric signal 17 through electrical cable 112. Photoelectric signal 17, which replicates remote electrical signal 13, is typically processed by electronic measurement instrument 113.

Figure 2:
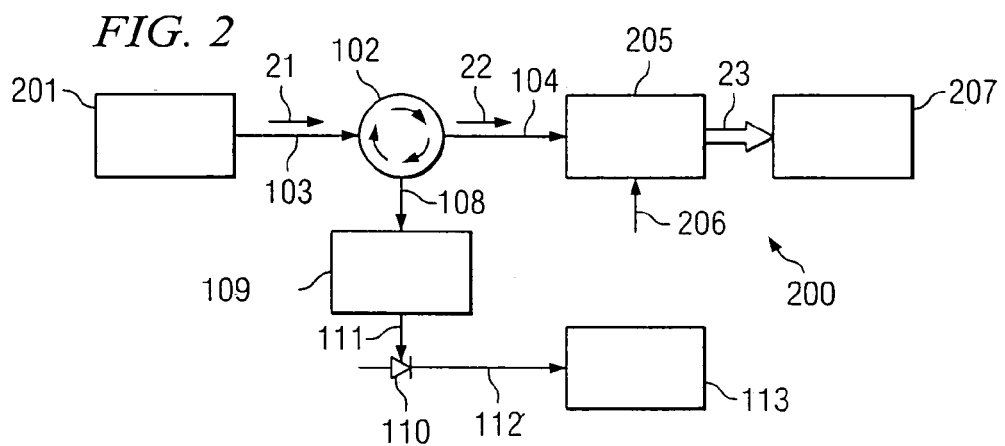
FIG. 2 depicts a system for remote delivery over an optical fiber link of a modulated signal for stimulating a remote electrical device, in accordance with embodiments of the invention.

FIG. 2 depicts system 200 for remote delivery over an optical fiber link of a modulated signal for stimulating a remote electrical device, in accordance with embodiments of the invention. Modulated light signal 21 from modulated light source 201 passes through optical fiber link 103, optical circulator 102, and as modulated light signal 22 through optical fiber link 104, and impinges on Reflection Mode Electroabsorption Modulator (REAM) 205. REAM 205 can be the same as REAM 105 depicted in FIG. 1. REAM 205, typically biased by negative voltage 206, converts modulated light signal 22 to electrical signal 23, which stimulates electrical device being tested 207. In this case, the response of remote electrical device 207 can be monitored by other means, such that circulator 102, optical amplifier 109, photodetector 110, and electronic measurement instrument 113 need not be used. These elements are shown to illustrate the fact that the same apparatus can be used either for stimulus testing as in FIG. 2 or for response testing as in FIG. 1, with the difference being whether the light source is CW or modulated.

Figure 3:
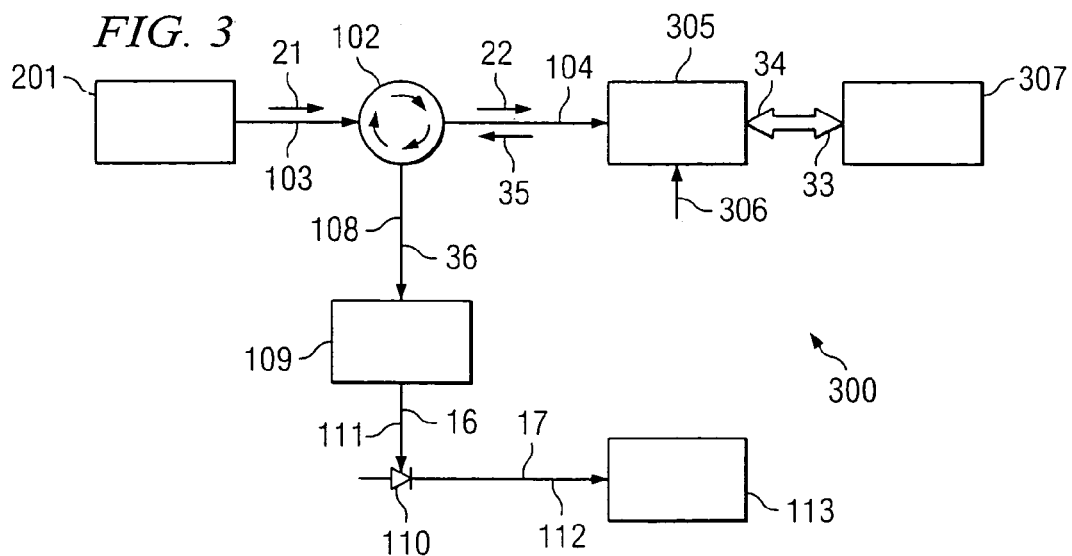
FIG. 3 depicts a system for concurrent delivery over an optical fiber link of stimulus and response signals both to and from a remote electrical device, in accordance with embodiments of the invention.

FIG. 3 depicts system 300 for concurrent delivery over an optical fiber link of stimulus and response signals both to and from a remote electrical device, in accordance with embodiments of the invention. Modulated light signal 21 from modulated light source 201 passes through optical fiber link 103, optical circulator 102, and as modulated light signal 22 through optical fiber link 104, and impinges on Reflection Mode Electroabsorption Modulator (REAM) 305. REAM 305 can be the same as REAM 205 depicted in FIG. 2. REAM 305, typically biased by bias voltage 306 for linear operation, converts modulated light signal 22 to electrical signal 33, which stimulates electrical device being tested 307. Electrical device 307 response 34 to stimulation 33, thereby modifying the voltage at its terminals, in turn modulates the reflection coefficient of REAM 305. The reflection coefficient of REAM 305 interacts with incident light 22, reflecting a modulated light replica 35 of response voltage 34 through optical guide 104, optical circulator 102, and optical guide segment 108 as modulated light replica 36, which is then typically amplified by optical amplifier 109 and transmitted as amplified modulated light replica 16 through optical guide segment 111 to photodetector 110 and processed by electronic measurement instrument 113. A typical application of the configuration shown in FIG. 3 is Time Domain Reflectometry, but other combined stimulus/response applications could also be performed, for example Network Analysis (Frequency-domain testing of electronic networks).

The acronym REAM represents "Reflection-mode Electroabsorption Modulator." A REAM is essentially an electroabsorption modulator configured to operate in reflection mode, for example by impinging light onto a first face of the modulator and terminating the opposite face of the modulator with a mirror. Reflection modulators have been used with free space optical beams to form communication systems.

The optical signal modulator can be any type of reflection mode modulator, including: electrooptic (EOM); electromechanical (EMM); and electroabsorption (EAM). Use of electro-optic modulators (EOMs) to convert electrical signals to modulated light, and photodetectors to convert the modulated light to an electrical signal is standard practice in many optical communication systems. The electroabsorption modulator (EAM), which has been advantageously reduced to practice, is believed to be unique among modulator types in having the ability to function as both a modulator and a detector of light. The applications depicted in FIGS. 2 and 3, for example, apply only to the electroabsorption modulator type.

Figure 4A:
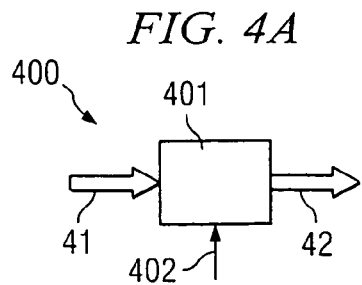
FIG. 4A depicts a modulator configuration, including an electroabsorption modulator (EAM), which controls the transmission intensity of a light beam in proportion to applied control voltage.
Figure 4B:
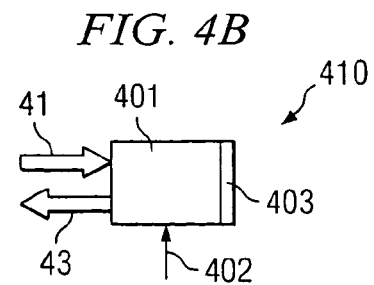
FIG. 4B depicts a reflection-mode EAM (REAM) in accordance with embodiments of the invention, combining an EAM with a reflecting surface.

FIG. 4A depicts modulator configuration 400 including electroabsorption modulator (EAM) 401, which controls the transmission intensity of a light beam in proportion to applied control voltage 402. EAM 401 modulates the transmitted light so that modulated light 42 exiting the right facet is a time-varying fraction of light 41 entering the left facet, with the time varying fraction being controlled by time varying control voltage 402. FIG. 4B depicts reflection-mode EAM (REAM) 410 in accordance with embodiments of the invention, combining EAM 401 with reflecting surface (e.g., a mirror) 403, having entrance beam 41 and modulated exit beam 43 at the left face of the modulator.

An advantage of the REAM geometry in sensing and probing applications is that only a single optical path is required. If, for example, the optical path is an optical fiber, then the complete assembly can be made much simpler and less complex.

Figure 5:
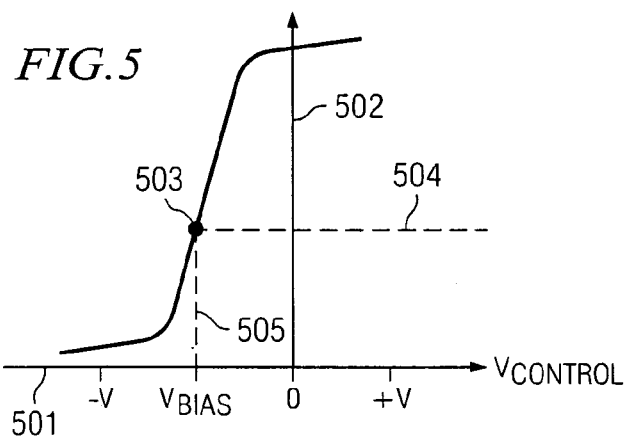
FIG. 5 is a graph of a transfer curve of reflected power-vs-voltage of a typical REAM for constant incident power, in accordance with embodiments of the invention.

FIG. 5 is a graph of a transfer curve of reflected power-vs-voltage of a typical REAM for constant incident power, in accordance with embodiments of the invention. Reflected power is displayed along vertical axis 502 as a function of control voltage along the horizontal axis 501. Bias voltage is a selected value of control voltage. To bias the device near the center of the linear operating range, it is necessary to apply a negative dc bias value, for example voltage 505. This produces an equilibrium reflected power value 504. Linear operation is then achieved centered around bias point 503. Devices can be built with Vbias=0, but such devices would typically have slow response of reflection to changes in modulating voltage.

The REAM absorbs light to varying degrees, depending on wavelength and the particular value of control voltage Vcontrol. Typically, if Vcontrol is zero volts, the REAM is said to be "transparent", and all light is reflected. If Vcontrol is set to Vbias, then the REAM operates in a linear region, and the amount of light reflected is linearly proportional to the applied voltage. Vbias can be used for detection mode, even though detection efficiency is not maximized. If the REAM is biased, for example, Vbias=−5V, then nearly all the incoming light is absorbed. This Vbias value can be used for detection mode operation when maximum detection efficiency and bandwidth are required.

When the REAM is biased to Vcontrol=a negative voltage, light is absorbed, and the energy of the incoming light is used to create "hole-electron pairs" of mobile charge. These mobile holes and electrons are swept out of the electrical terminals of the REAM as a current of flowing charge (photocurrent). This photocurrent has a fast response time, so that if the incoming light is modulated in intensity, the photocurrent generated by absorbing this light is modulated also, thereby producing a useful electrical replica of the modulated light intensity. This operating mechanism, called the photoelectric effect, which is used traditionally in photodetectors, enables the REAM to be used as a photodetector.

A basic description of the operation of one example of electroabsorption modulator is available on the internet at: http://www.bell-labs.com/project/oevlsi/tutorial/

A particular electroabsorption mechanism seen only in quantum wells is called the "quantum-confined Stark effect". This mechanism, like other electroabsorption mechanisms in semiconductors, is also very fast. There are no intrinsic speed limitations on the mechanism itself until timescales well below a picosecond. In practice, speed is limited only by the time taken to apply voltage to the quantum wells, which is typically limited by resistor-capacitance limits of the external circuit. Speeds of 40 GHz have been demonstrated.

Figure 6:
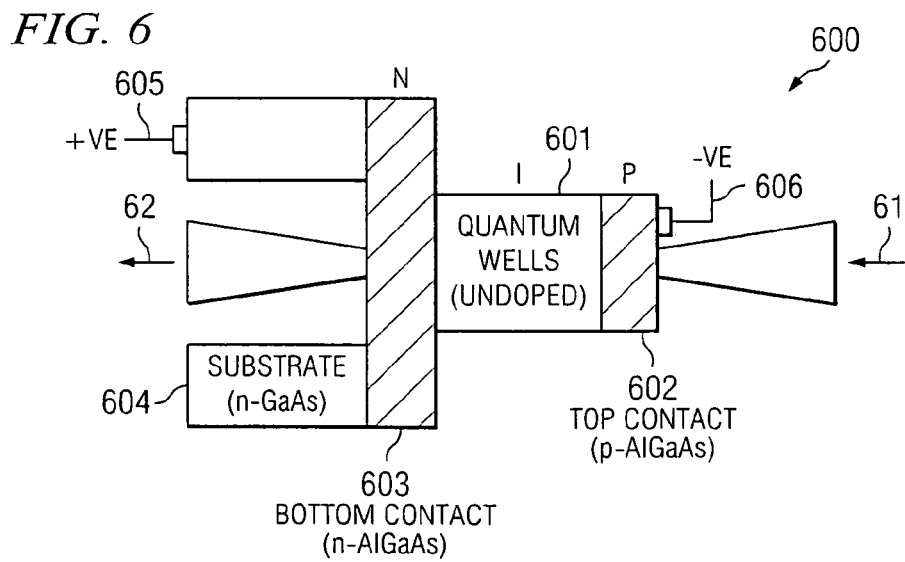
FIG. 6 depicts a quantum well modulator structure, one example of electroabsorption modulator (EAM)

FIG. 6 depicts quantum well modulator structure 600, one example of electroabsorption modulator (EAM). Quantum wells 601 are undoped intrinsic semiconductor layers, sandwiched between p-doped top contact 602 and n-doped bottom contact 603 on n-doped substrate 604. This forms a diode structure, which can be reverse biased through contacts 605, 606, to apply a modulated electric field perpendicular to the quantum well layers. The electric field modulates input light beam 61 to produce output modulated light beam 62. Structure 600 is made using gallium arsenide and aluminum gallium arsenide, working best at wavelengths of about 850 nm, although other semiconductor materials may be used. Quantum well structure and operation are further described, for example, in D. A. B. Miller, "Optoelectronic applications of quantum wells," Optics and Photonics News 1, No. 2, pp 7-15, February 1990.

Electrooptic modulators are typically based on the quadratic (Kerr) electrooptic effect, which is exhibited by crystals such as potassium tantalate niobate or barium titanate. Other electrooptic modulators are based on the linear (Pockels) electrooptic effect, which occurs in crystals such as potassium dideuterium phosphate or cesium dideuterium arsenate. Electromechanical modulators are based on the principles of stress birefringence or photoelasticity, and include a class of acoustooptic modulators using material such as crystalline quartz. Electrooptic and electromechanical modulation are summarized in Hecht, "Optics," Second Edition, Addison-Wesley Publishing Company, pp. 314-321, 1987.

Figure 7A:
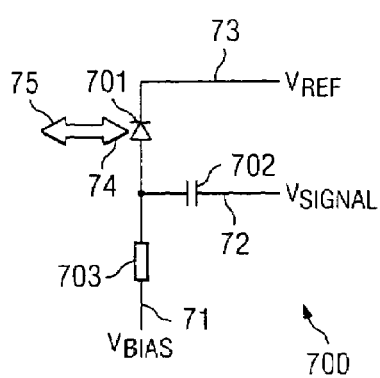
FIG. 7A depicts a REAM configuration biased for linear operation, with AC coupled input signal, in accordance with embodiments of the invention.

FIG. 7A depicts REAM configuration 700 biased for linear operation, with AC coupled input signal, in accordance with embodiments of the invention. Basic REAM device 701 is diagrammed as an electronic diode. Bias voltage 71 is applied through bias resistor 703, and electrical signal 72 is coupled in/out through AC coupling capacitor 702. Reference voltage 73 is supplied to REAM 701. Light beams 74, 75 modulate/are modulated by electrical signal 72. As with many electronic devices, the REAM is typically biased, as described in connection with FIG. 5, and the proper bias voltage does not necessarily coincide with the voltage being sensed. In many cases, AC coupling between the REAM and the voltage under test is required.

Figure 7B:
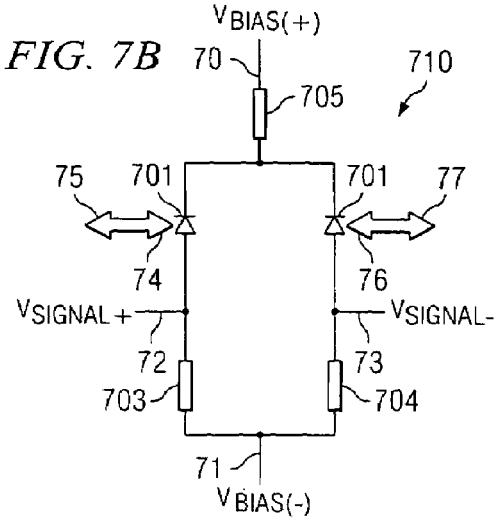
FIG. 7B depicts a differential pair REAM configuration, in accordance with embodiments of the invention.

FIG. 7B depicts differential pair REAM configuration 710, in accordance with embodiments of the invention. One way to configure a DC-coupled REAM sensor is to arrange basic REAM devices 701 to operate in differential pairs. Negative bias voltage 71 is applied through respective bias resistors 703, 704, positive bias voltage 70 is applied through bias resistor 705, and electrical signals are connected at 72, 73. Signals can be either modulated voltage signals or DC reference voltages. Light beams 74-77 modulate/are modulated by electrical signals 72, 73.

Figure 8A:
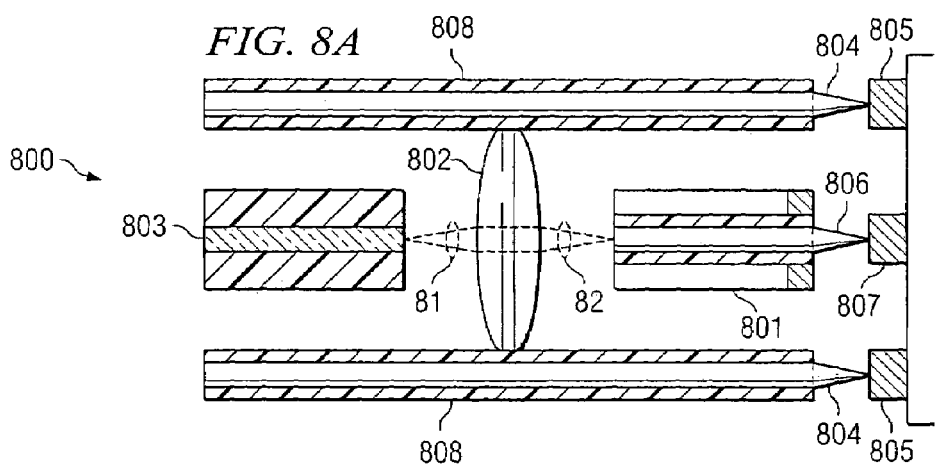
FIGS. 8A-8E illustrate REAM configurations for a variety of applications.

FIGS. 8A-8E illustrate REAM configurations for a variety of applications. FIG. 8A depicts REAM configuration 800, in which voltage from signal 807 and ground 805 is applied to REAM 801 through contacting probe tips 804, 806 in housing 808, in accordance with embodiments of the invention. Input and exit light beams 81, 82 are coupled through lens 802 between optical fiber 803 and REAM 801. REAM configuration 800 has high input impedance, such that it presents minimal electrical loading to the signal line.

Figure 8B:
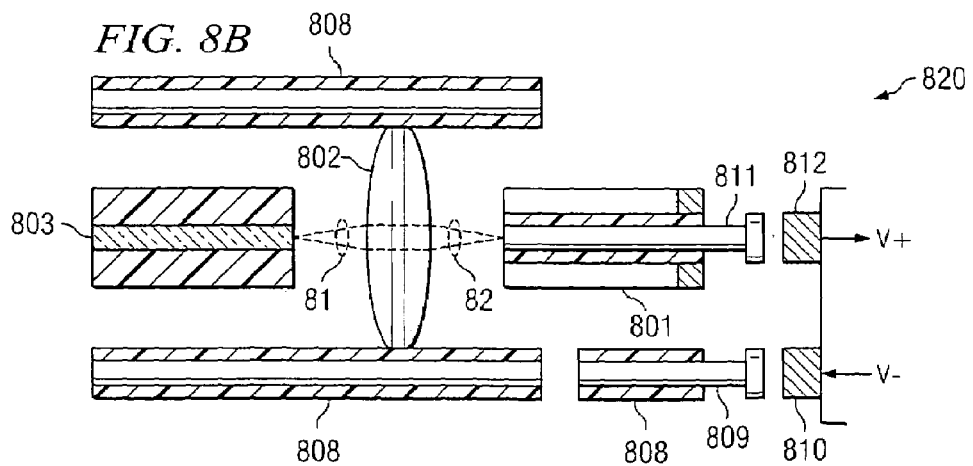

FIG. 8B depicts REAM configuration 820, in which voltage 810, 812 is applied to REAM 801 through non-contacting, electrostatic-coupled probe tips 809, 811 in housing 808, in accordance with embodiments of the invention. Input and exit light beams 81, 82 are coupled through lens 802 between optical fiber 803 and REAM 801. REAM configuration 820 has high input impedance, such that it presents minimal electrical loading to the signal line.

Figure 8C:
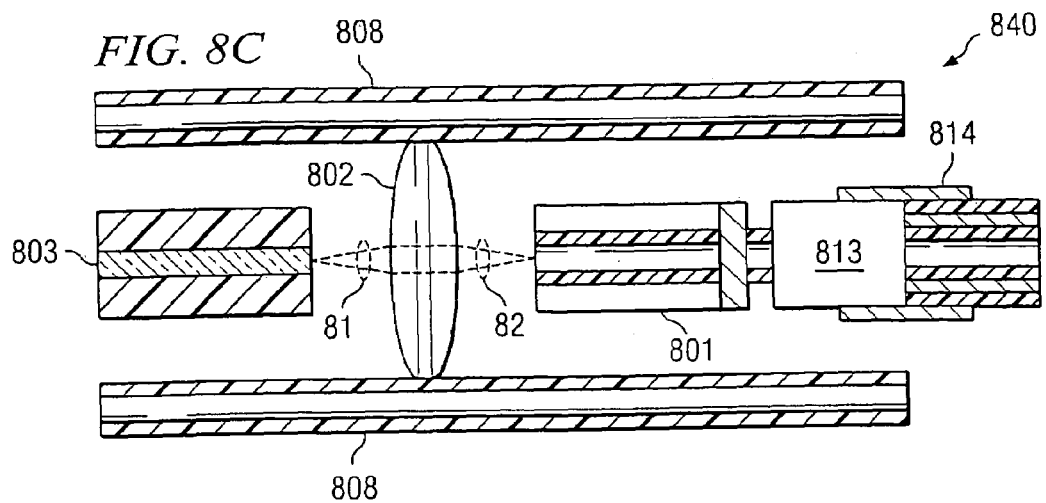

FIG. 8C depicts REAM configuration 840, in which voltage is applied to REAM 801 through impedance matching network 813 attached to coaxial connector 814, in accordance with embodiments of the invention. Input and exit light beams 81, 82 are coupled through lens 802 between optical fiber 803 and REAM 801. REAM configuration 840 presents a matched load to the coaxial connector (typically 50 ohms).

Figure 8D:
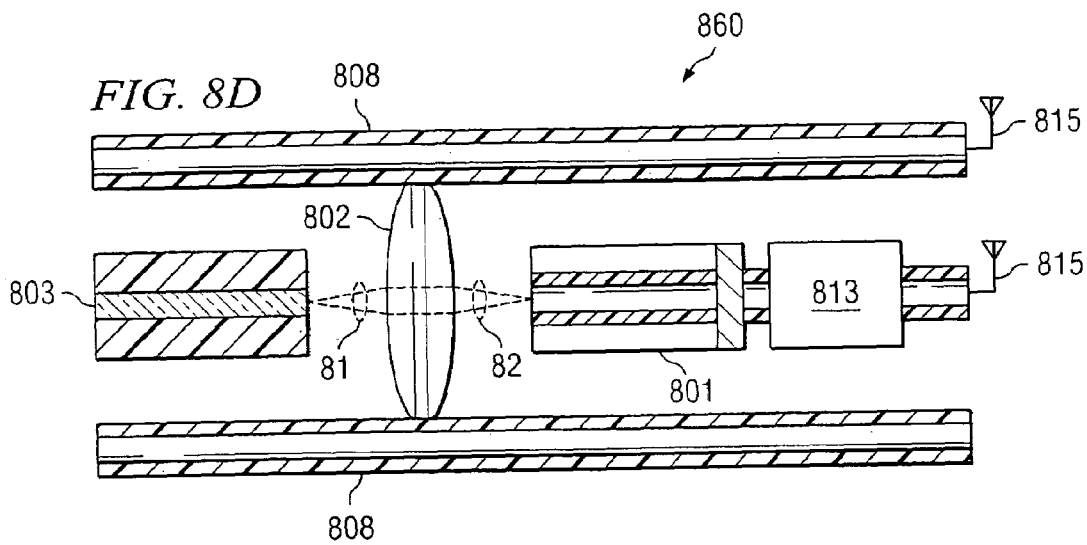

FIG. 8D depicts REAM configuration 860, in which voltage is applied to REAM 801 through terminals of antenna 815, in accordance with embodiments of the invention. Antenna 815, as traditionally configured, may be a single antenna having at least two terminals, one of which can be ground. Matching network 813 transforms the REAM impedance to an optimal load for antenna 815. Input and exit light beams 81, 82 are coupled through lens 802 between optical fiber 803 and REAM 801.

Figure 8E:
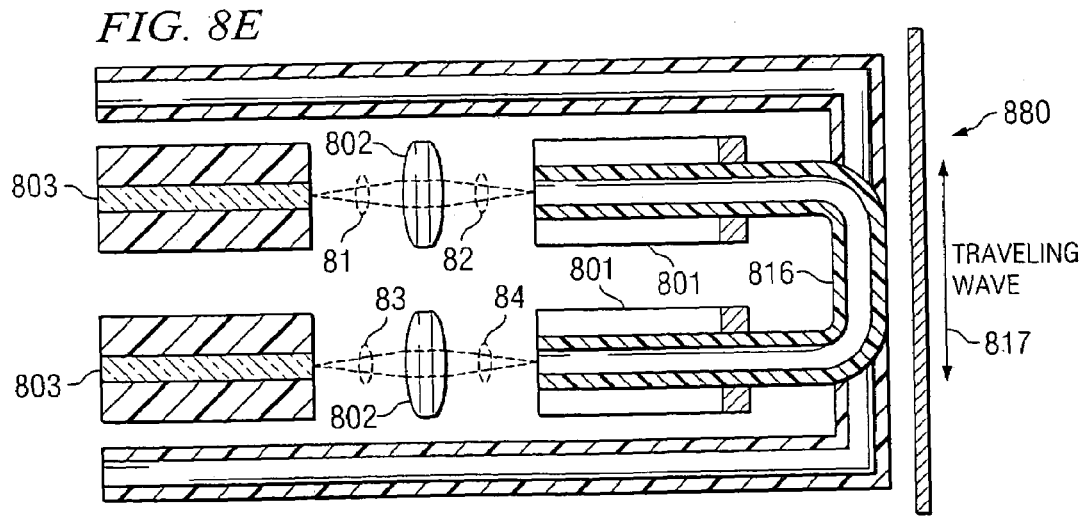

FIG. 8E depicts REAM configuration 880, in which voltage is applied to REAMs 801 through electromagnetic wave directional coupler 816, in accordance with embodiments of the invention. The voltage is proportional to the traveling wave amplitude on electromagnetic line 817. Input and exit light beams 81, 82 and 83, 84 are coupled through lenses 802 between optical fibers 803 and REAMs 801.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. An optoelectronic system comprising:
    an optical signal modulator, wherein said optical signal modulator is an electroabsorption modulator (EAM);
    an optical input guide and an optical output guide connected to said optical signal modulator, wherein said optical input guide and said optical output guide are a single optical guide;
    a reflective optical element in said optical signal modulator, said element disposed to reflect an input light beam incident through said optical input guide into an output light beam through said optical output guide;
    an electrical terminal in said optical signal modulator, said electrical terminal configured such that an electrical signal on said electrical terminal is operable to interact with said input light beam, wherein said input light beam is operable to interact to modulate said electrical signal; and
    an optical circulator in communication with said single optical guide, said circulator adapted to receive said input light beam along a first path, to pass said input light beam to said EAM, and to pass said output light beam along a second path different from said first path.

2. The system of claim 1 wherein said electrical signal is operable to interact to modulate said output light beam.

3. The system of claim 1 comprising a plurality of EAMs interconnected electrically in a balanced parallel configuration.

4. The system of claim 1 wherein said electrical terminal is coupled to a voltage source through contacting probe tips.

5. The system of claim 1 wherein said electrical terminal is coupled to a voltage source through non-contacting probe tips.

6. The system of claim 1 wherein said electrical terminal is coupled to a voltage source through an impedance matching network.

7. The system of claim 1 wherein said electrical terminal is coupled to a voltage source through an electromagnetic wave directional coupler.

8. The system of claim 1 wherein said system is operable to deliver a copy of an electrical signal from a remote electrical device to an electronic measurement instrument over an optical fiber.

9. The system of claim 1 wherein said system is operable to deliver a modulated signal over an optical fiber for stimulating a remote electrical device.

10. The system of claim 9 operable concurrently to deliver a copy of an electrical signal over said optical fiber from a remote electrical device to an electronic measurement instrument.

11. A method of remote delivery of a modulated signal, said method comprising:
   modulating an input light beam with an electrical signal using optical signal modulation;
   reflecting said modulated light beam into an output light beam direction different from that of said input light beam; and
   concurrently modulating said electrical signal by interacting with said input light beam using electroabsorption modulation.

12. The method of claim 11 further comprising applying a bias voltage concurrently with said electrical signal.

13. The method of claim 11 wherein said output light beam and said input light beam propagate in opposite directions through a single optical fiber.

14. The method of claim 11 wherein said input light beam delivers a replica of an electrical stimulus signal.

15. The method of claim 11 wherein said output light beam delivers a replica of an electrical response signal from a remote electrical device to an electronic measurement instrument.

16. The method of claim 15 wherein said input light beam delivers a replica of an electrical stimulus signal to a remote electrical device.

17. The method of claim 11 wherein said concurrently modulating said electrical signal comprises:
   delivering a modulated signal in said input light beam over an optical fiber; and
   stimulating a remote electrical device with said modulated electrical signal.

18. The method of claim 11 wherein said modulated light beam is a copy of said electrical signal that modulates said input light beam, and wherein reflecting said modulated light beam comprises:
   concurrently delivering said copy of said electrical signal over an optical fiber from a remote electrical device to an electronic measurement instrument.

19. An optoelectronic system comprising:
   an optical intensity modulator;
   an optical input guide and an optical output guide connected to said optical intensity modulator, wherein said optical input guide and said optical output guide are a single optical guide;
   a reflective optical element in said optical intensity modulator, said element disposed to reflect an input light beam incident through said optical input guide into an output light beam through said optical output guide;
   an electrical terminal in said optical intensity modulator, said electrical terminal configured such that an electrical signal on said electrical terminal is operable to interact with said input light beam, wherein said input light beam is operable to interact to modulate said electrical signal; and
   an optical circulator in communication with said single optical guide, said circulator adapted to receive said input light beam along a first path, to pass said input light beam to said modulator, to receive said output light beam, and to pass said output light beam along a second path different from said first path.

20. The system of claim 19 comprising a plurality of optical intensity modulators interconnected electrically in a differential configuration.

* * * * *